United States Patent
Thomas et al.

[11] 3,880,755
[45] Apr. 29, 1975

[54] METHOD AND APPARATUS FOR SEPARATING CHEESE WHEY PROTEIN

[75] Inventors: Frank A. Thomas, Greenwood, Wis.; Donald D. Spatz, Excelsior, Minn.

[73] Assignee: Osmonics, Inc., Hopkins, Minn. ; by said Spatz

[22] Filed: May 22, 1973

[21] Appl. No.: 362,828

[52] U.S. Cl. ............... 210/91; 210/181; 210/194; 210/433
[51] Int. Cl. ........................................ B01d 31/00
[58] Field of Search ............ 210/321, 433, 23, 490, 210/22, 181, 194, 195, 196, 197, 91

[56] References Cited
UNITED STATES PATENTS

| | | | |
|---|---|---|---|
| 3,341,024 | 9/1967 | Lowe et al. | 210/490 |
| 3,472,765 | 10/1969 | Budd et al. | 210/433 X |
| 3,536,612 | 10/1970 | Kopecek et al. | 210/23 |
| 3,634,128 | 1/1972 | Bolin | 210/23 X |
| 3,695,446 | 10/1972 | Lyall et al. | 210/321 |
| 3,700,591 | 10/1972 | Higley | 210/23 |
| 3,722,694 | 3/1973 | Agranat | 210/433 X |
| 3,734,297 | 5/1973 | Windle | 210/433 X |
| 3,786,924 | 1/1974 | Huffman | 210/321 X |

FOREIGN PATENTS OR APPLICATIONS

| | | | |
|---|---|---|---|
| 84,684 | 4/1958 | Denmark | 210/22 |

*Primary Examiner*—Frank A. Spear, Jr.
*Attorney, Agent, or Firm*—John C. Cooper, III; Fred Wiviott; Ralph G. Hohenfeldt

[57] ABSTRACT

Whey separated from milk curd during the manufacture of cheese is processed for human consumption by heating the whey to a temperature of 162°F and holding it at this temperature for 16 seconds, cooling the whey to a temperature under 90°F, separating protein from the whey, and chilling the protein to a temperature under 40°F. The heating, holding, and cooling are carried out in under 30 seconds. The protein separation is carried out by passing the whey through a series of membrane banks. Each bank has a manifold arranged for receiving whey under pressure, and a plurality of filters connected to and arranged in communication with the manifold for permitting the whey received from the manifold to seek its own flow in the filters. Each filter has a plurality of spiral-wound membrane modules arranged serially in a pressure vessel for fractionating the whey.

9 Claims, 8 Drawing Figures

PATENTED APR 29 1975 3,880,755

METHOD AND APPARATUS FOR SEPARATING CHEESE WHEY PROTEIN

BACKGROUND OF THE INVENTION

1. Field of the Invention

This invention relates generally to the processing of liquids, and particularly to the separation of cheese whey into protein and lactose.

2. Description of the Prior Art

Cheese is manufactured by separating milk whey from the curd and curing the latter. The whey usually becomes a waste product, increasing the cost of the cheese and creating a pollution problem as to its disposal. Potentially, however, whey contains protein and lactose which can be processed for human consumption. Accordingly, in recent years much research activity has been directed toward developing commercially usable methods and apparatus for processing cheese whey, and out of this research has come the proposal to use reverse osmosis and other methods of ultrafiltration for processing cheese whey. See, for example, Mc-Donough and Mattingly, "Pilot Plant Concentration of Cheese Whey by Reverse Osmosis", Food Technology, 24:194, 1970.

Reverse osmosis is usually associated with the desalting of water. In this application, the applicable principle, known as osmosis, is that when pure water and a salt solution are arranged on opposite sides of a semipermeable membrane, the difference in salt concentration between the water and salt solution causes salt-solution diluting, pure water to flow through the membrane as if a pressure were being exerted on it. By applying a pressure to the salt solution, pure water is forced through the membrane oppositely to normal osmotic flow and into the pure water side. The critical structure in a reverse-osmosis water purification system, therefore, is a semipermeable membrane which will pass water, but not salt.

Several systems have been developed for carrying out reverse osmosis ultrafiltration processes. Conventional among these are the plate-and-frame, tubular, spiral-wound membrane module, and hollow-fiber designs. The most important parameter to be taken into consideration in the design of a reverse osmosis system is that while the semipermeable membrane is very thin, perhaps no more than four to six mils in thickness, it must provide a firm support to withstand the very high pressure drop across it. Although cellulose acetate is a preferred material for a reverse osmosis membrane, recent developments in polymers have provided other suitable materials. The membranes can be varied to pass more or less sugar and salt.

The principle employed in using a reverse-osmosis system to fractionate whey takes advantage of the fact that the protein molecules in the whey are larger than the other constituents of whey. Accordingly, while these other constituents may be forced through a semipermeable membrane, the protein molecules will be rejected by the membrane.

SUMMARY OF THE INVENTION

It is an object of the present invention to provide a method for processing cheese whey for use in the food trade.

It is another object of the present invention to provide a method for separating high quality protein from cheese whey.

It is yet another object of the present invention to provide apparatus for separating protein from cheese whey by the separating method according to the present invention.

It is a still further object of the present invention to provide an economical, efficient, and versatile reverse-osmosis or ultrafiltration system for separating protein from cheese whey.

These and other objects are achieved according to the present invention by providing a method having the steps of: heating whey to a temperature of 162°F and holding it at this temperature for 16 seconds; cooling the whey to a temperature under 90°F; separating protein from the whey; and chilling the protein to a temperature under 40°F. Preferably, the step of cooling the whey includes the steps of: cooling to a temperature of 94°F; holding the heated whey in a thermally insulated container; and cooling the whey to a temperature, for example, in the range of 82°F to 86°F. Advantageously, the heating, holding, and cooling steps are carried out in 30 seconds, or less.

The step of separating protein from the whey involves membrane filtering whey for forming a protein concentrate and a permeate, and refiltering the protein concentrate for further concentrating it. The refiltering step may be repeated as often as desired.

Preferred apparatus for carrying out the protein separating method according to the present invention has a manifold arranged for receiving whey under pressure, and a plurality of membrane filters connected to and arranged in communication with the manifold for receiving whey from the manifold.

A preferred filter embodiment according to the present invention has a pressure vessel provided with a cylindrical wall and open ends. A plurality of spiral-wound membrane modules are arranged serially in the pressure vessel. Each of these modules has a perforated, permeate collection tube forming a center core of the module, and a membrane constructed from a suitable, known material spirally-wound on the tube. End caps are arranged covering the open ends of the pressure vessel, each end cap adjacent the manifold having a fitting connected to the manifold, and each end cap arranged at an end of the pressure vessel spaced from the manifold provided with an opening and a connector spaced from the opening. The opening advantageously discharges protein concentrate, while the connector couples to the center tube of an adjacent membrane module for receiving permeate.

The filters are desirably arranged in a plurality of banks, each bank having a separate manifold. The protein concentrate outlet of each bank is connected to the input of an adjacent bank, with the last bank in the series connected to a discharge device.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
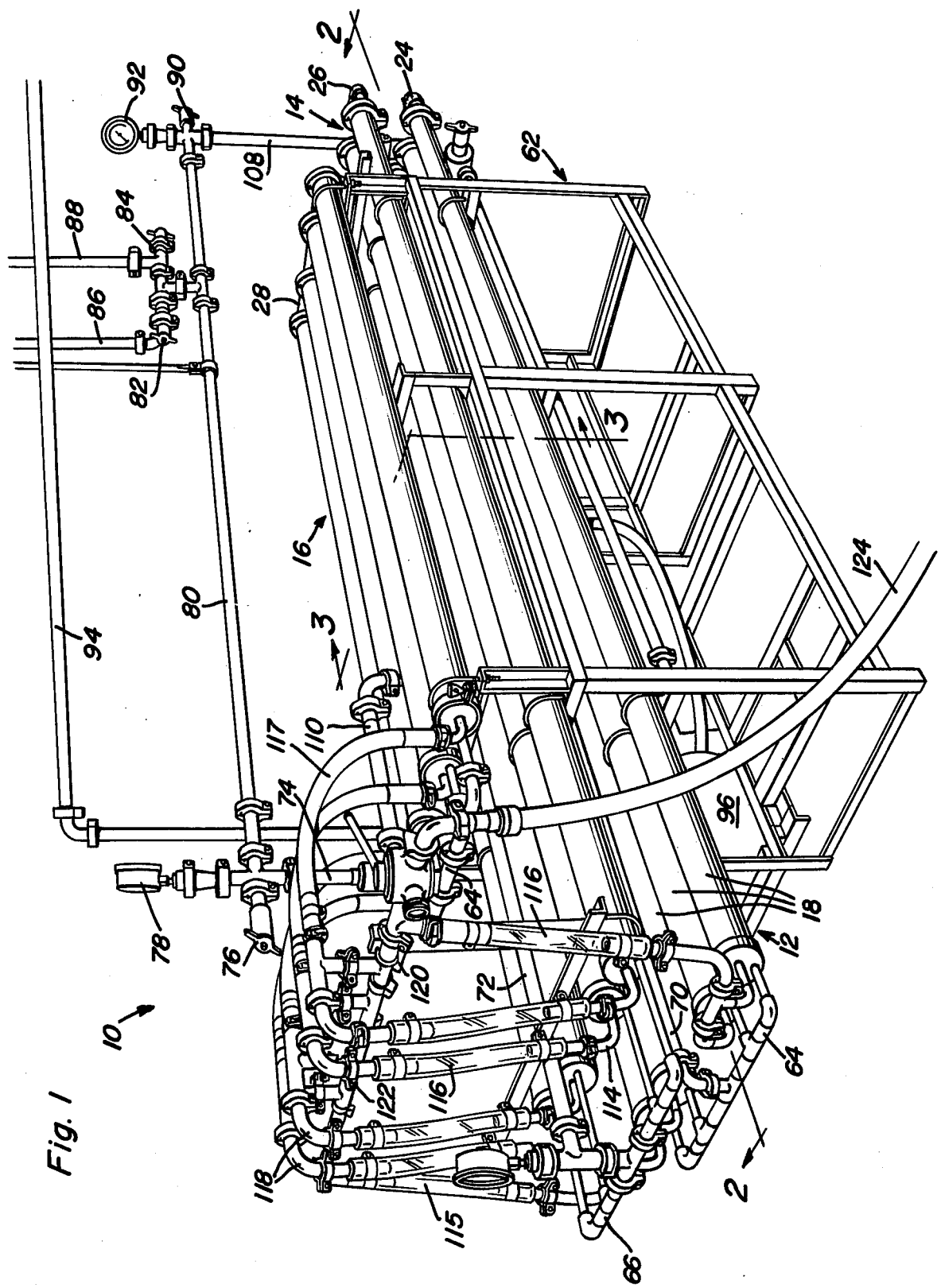
FIG. 1 is a fragmentary, perspective view showing cheese-whey separating apparatus according to the present invention.
Figure 2:
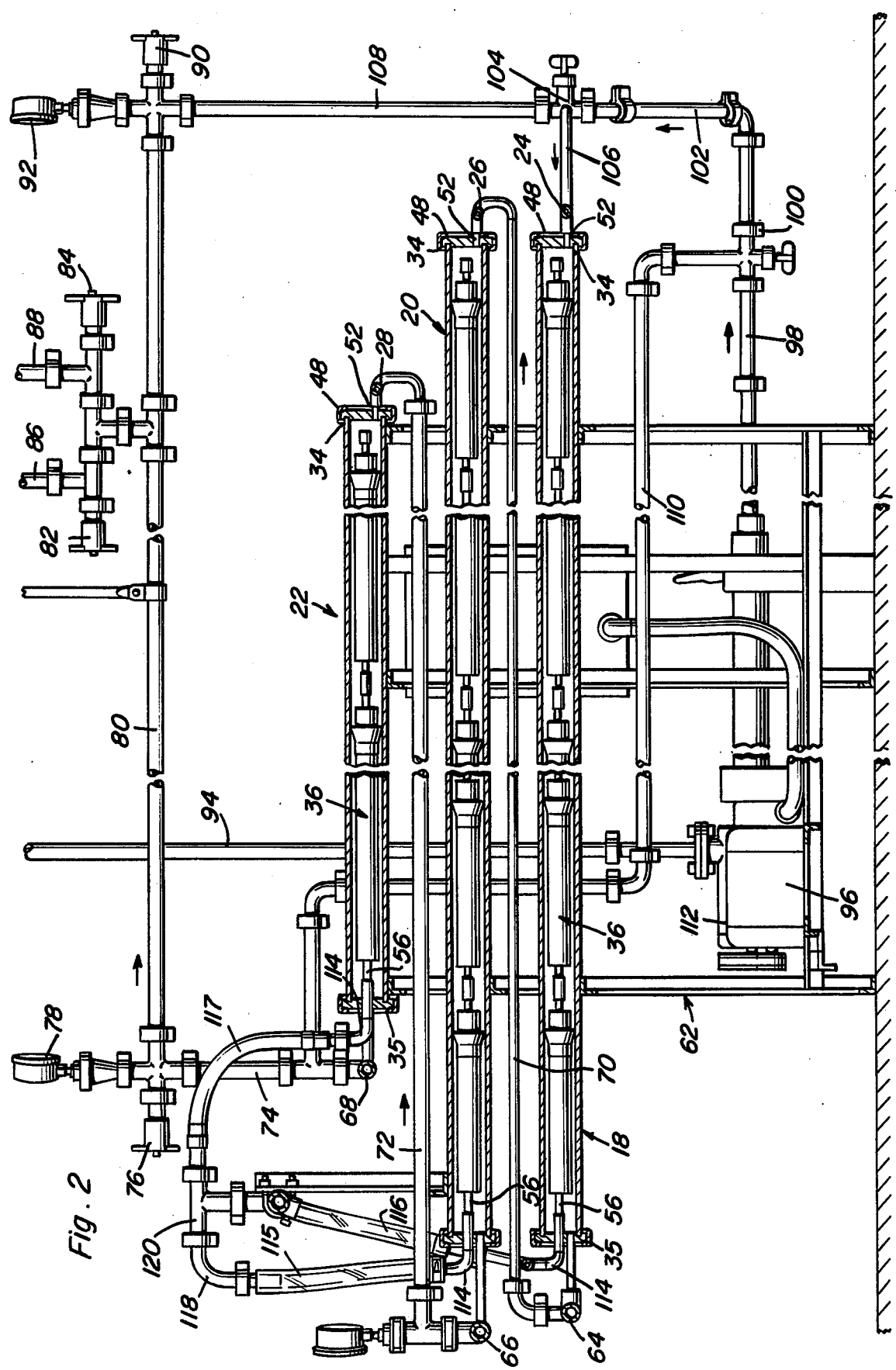
FIG. 2 is a fragmentary, sectional view taken generally along the line 2—2 of FIG. 1.
Figure 3:
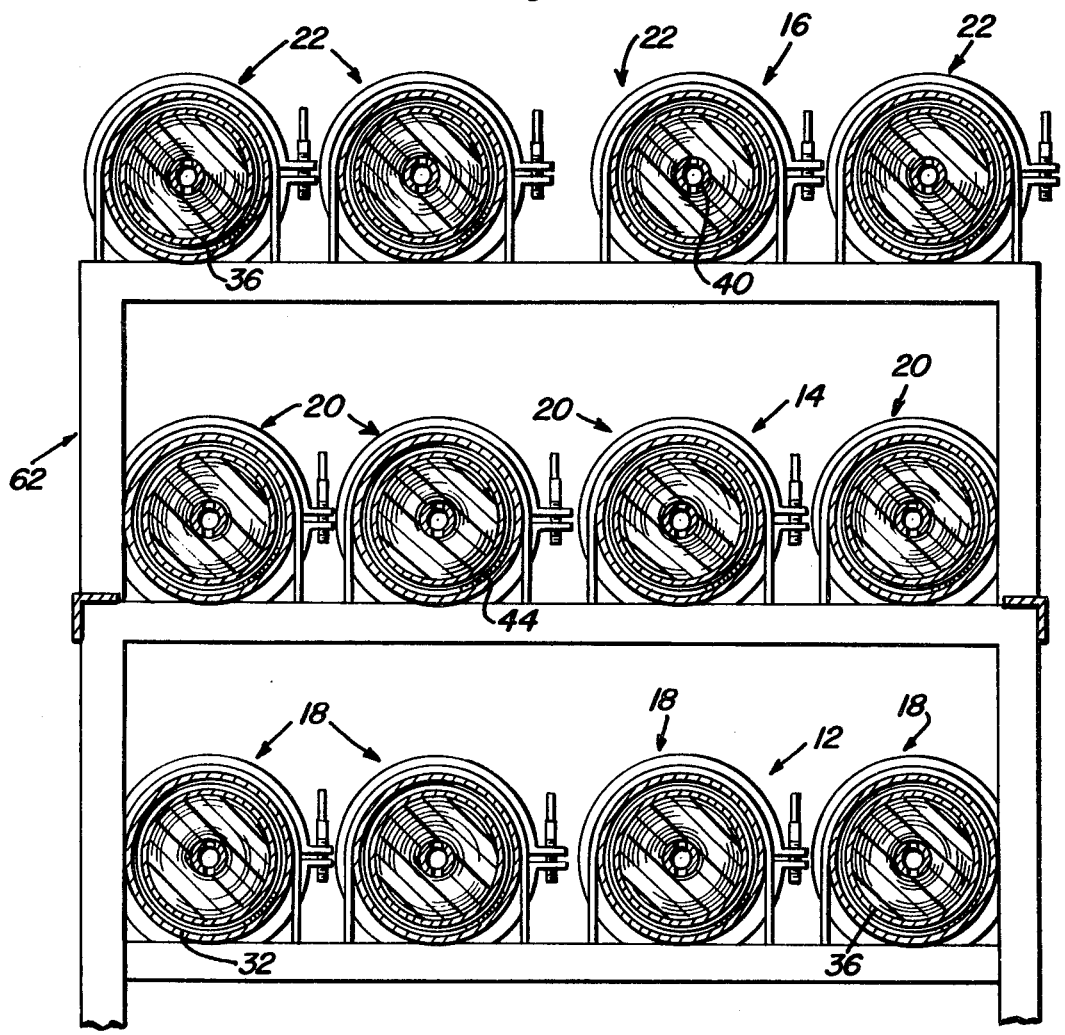
FIG. 3 is a fragmentary, sectional view taken generally along the line 3—3 of FIG. 1.

FIGS. 1 to 3 of the drawings show a reverse-osmosis ultrafiltration unit 10 formed from a plurality of banks 12, 14 and 16 of filters 18, 20, and 22. These filters are connected to and arranged in communication with respective manifolds 24, 26, and 28 for receiving whey under pressure from the manifolds.

Figure 4:
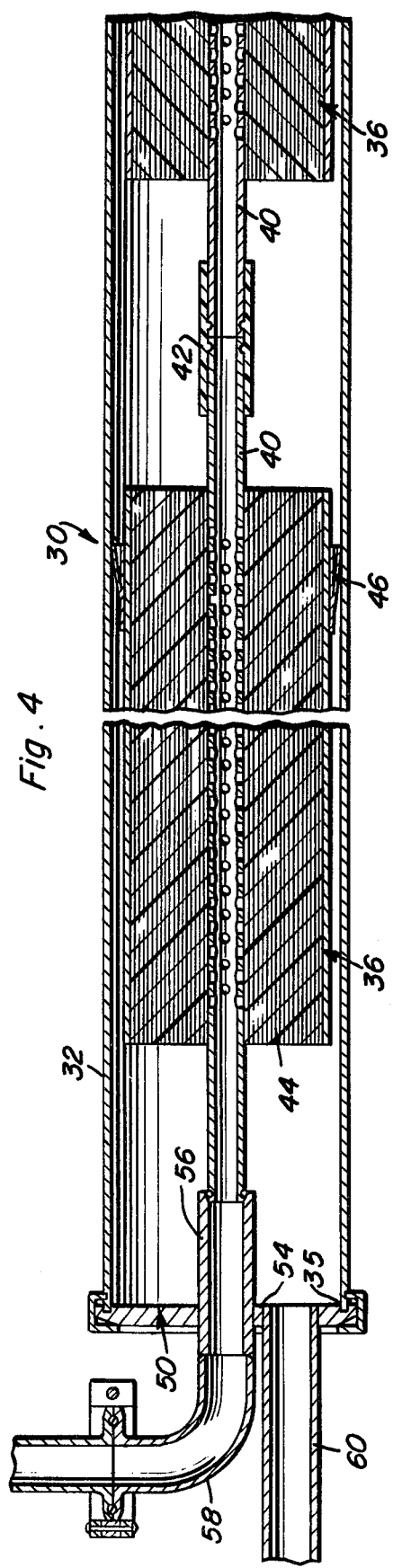
FIG. 4 is a fragmentary, vertical longitudinal sectional view showing a membrane filter module according to the present invention.
Figure 6:
FIG. 6 is a perspective view showing a spiral-wound membrane module used with apparatus according to the present invention.
Figure 7:
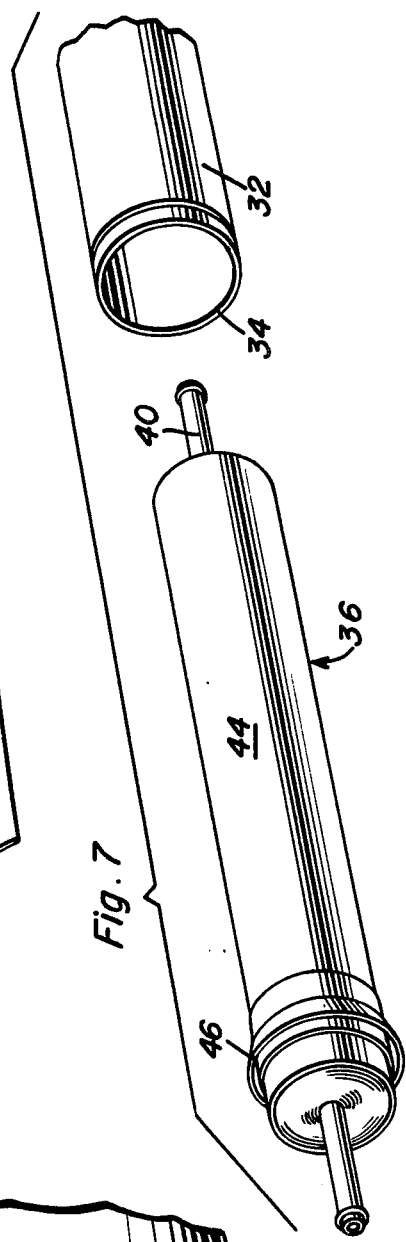
FIG. 7 is an exploded, perspective view showing a spiral-wound membrane module and associated pressure vessel of a filter according to the present invention.
Figure 5:
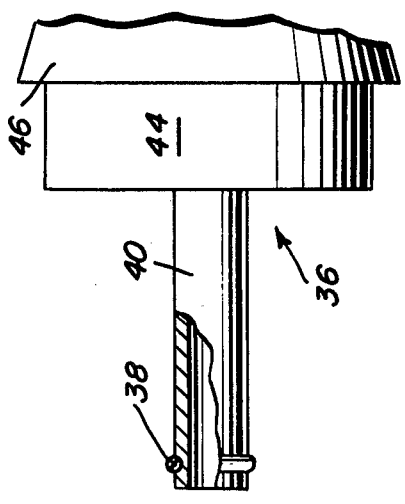
FIG. 5 is a fragmentary, side elevational view, partly cut away and in section, showing an end portion of a membrane filter module according to the present invention.

Referring now to FIG. 4 of the drawings, each filter 18, 20, and 22 is formed by a pressure vessel 30 having a cylindrical, or tubular wall 32 and open ends 34 and 35 (FIG. 2). A plurality of spiral-wound membrane modules 36 are arranged serially in pressure vessel 30. Connection between modules 36 is achieved by resilient rings 38 (FIG. 5) arranged in grooves provided on the ends of perforated tubes 40 forming a core and permeate collector. A connecting sleeve 42, constructed from a suitable material, fits over rings 38 to complete the connection between modules 36. A membrane 44 (FIG. 6) is spirally-wound on tube 40 so as to form in effect a flat envelope open at one end to transfer the lactose solution to tube 40. Membrane 44 may have a backing constructed in a known manner from a synthetic or glass fabric material capable of withstanding the high pressures encountered inside pressure vessel 30. Pressure vessel 30, modules 36, and flow inhibitors 46 (FIGS. 5 and 7) may be standard items manufactured by the Osmonics, Inc. of Hopkins, Minn. Flow inhibitors 46 (FIGS. 5 and 7) are advantageously arranged on the modules 36 at their upstream ends to direct the flow in the module. Specially constructed end caps, to be discussed below, fit on the standard pressure vessel formed by cylindrical wall 32. The function of flow inhibitors 46 will also be discussed below.

These membrane modules 36 are also disclosed in the paper "Reclamation and Re-use of Waste Products from Food Processing by Membrane Processes" by D. Dean Spatz, presented to the American Institute of Chemical Engineers, May 24, 1972.

Manifold 24, as well as the other fittings, may be constructed of 3–A approved dairy fittings of clean-in-place (CIP) design and, for example, 1 ½ inch diameter. Heavy duty CIP clamps may also be used to connect together conventional fittings to form the manifolds, and to connect these fittings to pressure vessels 30. Fittings 52 may be one inch stainless piping welded to end caps 48, at the level of the bottom of pressure vessel 30. The plurality, for example six, serially arranged modules 36 in vessels 30 may be, for example, 26¼ inches long and specially wound for use in filters according to the present invention so as to have an outside diameter of 3.83 inches. At each end of each membrane 44 is a plastic support wheel with a plurality of, for example, ⅛ inch holes through which the product flows. The support wheels may also be turned to an outside diameter of 3.83 inches to fit inside, for example, 4 inch stainless dairy tubing forming vessels 30. Perforated tubes 40 may extend approximately two inches beyond the ends of membrane 44. Six modules as described above may be connected together inside a pressure vessel 30 of, for example, 157 inches. At each end of pressure vessel 30 is a CIP cap held to pressure vessel 30 with a suitable, known CIP dairy clamp and drilled for both the aforementioned one inch stainless pipe through which the whey or protein product enters at the level of the bottom of the pressure vessel 30 and exactly in the center for insertion of a one inch stainless shaft which has been drilled completely through lengthwise 0.688 inch to support and seal the O-ring on the center of the spiral wound element.

End caps 48 (FIG. 2) and 50 (FIG. 4) are arranged covering the open ends 34, 35. A fitting 52 (FIG. 2) is provided on end caps 48 adjacent cylindrical wall 32, and is connected to a manifold 24, 26, 28. End caps 50, arranged covering end 35, which is spaced from manifold 24, 26 and 28, has an opening 54 arranged adjacent cylindrical wall 32, and a connector 56 spaced from opening 54 and connected to a tube 40 of a module 36 arranged in pressure vessel 30 adjacent connector 56 and its end cap 50. An elbow 58 is connected to connector 56 in a conventional manner, while a length of tubing 60 is arranged in opening 54 to facilitate connection of a hose to opening 54.

Filter banks 12, 14, and 16 are advantageously supported on a frame 62 of conventional construction, and may be retained on frame 62 as by conventional brackets best seen in FIG. 3 of the drawings.

Openings 54 in end caps 50 are attached to outlet manifolds 64, 66, and 68. A pipe 70 carries protein concentrate from manifold 64 to inlet manifold 26, while a pipe 72 performs a similar function between outlet manifold 66 and inlet manifold 28. A pipe 74 extends from manifold 68 to a conventional dairy valve 76 and a pressure gauge 78, while a pipe 80 is connected to valve 76, and has arranged in its length a pair of micrometer valves 82 and 84 from which extend respective pipes 86 and 88. Pipe 80 is anchored at an end spaced from valve 76 to a valve 90, to which is attached a gauge 92 which may be similar to gauge 78.

Figure 8:
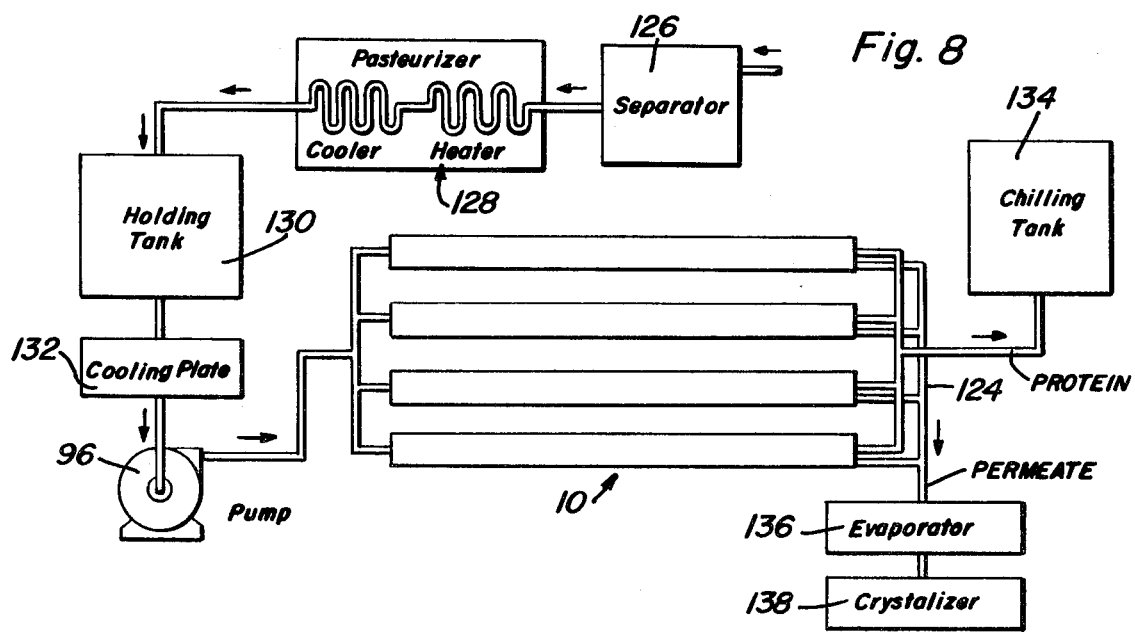
FIG. 8 is a schematic flow diagram of a cheese whey processing method according to the present invention.

A pipe 94 feeds cooled whey from a suitable cooling device, shown schematically in FIG. 8, to a conventional pump 96. Pump 96 is a suitable, known type of positive displacement or centrifugal pump, which feeds the whey under pressure through a pipe 98 to a conventional valve 100. A pipe 102 extends from valve 100 to another conventional valve 104 which is connected to a pipe 106 extending to manifold 24. A pipe 108 is connected between valves 90 and 104, while a pipe 110 extends from valve 100 to pipe 74. A motor 112, which may be a conventional electric motor, is mounted on frame 62 to selectively actuate pump 96.

Permeate passes from the perforated tubes 40 through connectors 56, and into a flow path defined by elbows 114, transparent sleeves 115 and 116, elbows 118, tees 120, and into a manifold 122 from where it passes out a hose 124. Sleeves 117 bypass elbows 118 and are connected directly to tees 120.

OPERATION

In a separating unit 10 according to the present invention, a predetermined amount, say 27 gallons, of cooled, pasteurized whey is fed into manifold 24 per minute. A pressure of 160 psi is advantageous at manifold 24.

The product, or whey, flows into each pressure vessel 30 of membrane filters 18 in bank 12 through fittings 52. The rings 38, which may be conventional O-rings, over which sleeves 42 are slipped seal modules 36 together and keep the feed protein product from mingling with permeate, or salt-sugar-water solution, that separates in the filters.

The protein feed is fed via pipe 70 to bank 14, and subsequently, by means of pipe 72, to bank 16. The protein concentrate now goes out through manifold 68, pipe 74, and through an open valve 76 to pipe 80. The latter extends across the length of the apparatus lengthwise to meet pipe 108 and valve 90. A conventional tee is arranged in pipe 80 with the micrometer valves 82 and 84. One of these valves, say valve 82, adjusts the back pressure at which the machine operates, and the other, say valve 84, adjusts the removal rate of the protein concentrate.

Valves 76 and 100 are conventional dairy compression valves, as are valves 90 and 104. By opening two of these compression valves and closing the other two, it is possible to direct the flow through the filter banks in opposite directions. The ability to reverse the flow is essential in cleaning the machine. For example, when valves B and C are closed, and A and D are open, the flow will go through pipe 106 into manifold 24 and through the machine in the direction described above. It will pass through valve 76, and into pipe 80 to be discharged through valves 82 and 84. By placing valves 90 and 104 open, and closing valves 76 and 100, the flow from pump 96 will be forced through pipe 110, through the filters in reverse, and out through pipes 108 and 80 to valves 82 and 84.

Unit 10 according to the present invention may be used either as a continuous concentrating device by adjusting micrometer valve 82 to a desired pressure of, for example, 160 psi, and having the enriched product issuing from that valve return to a fitting behind pump 96 and just in front of the cooling plate to allow the entrance of only enough fresh product to compensate for the portion of the feed being removed as permeate and also thereby causing a continual increase in the percentage of protein and solids within the system until it reaches the desired level, at which time micrometer valve 84 is opened a bit to allow the removal of product at the same rate at which the machine is concentrating. This product is then directed to a refrigerated tank and chilled to under 40° at once, as will be discussed below.

A higher concentration rate of the protein product may be obtained by routing the flow through micrometer valve 82 back to a holding tank, thereby allowing a full flow of fresh product over the membranes 44 and maintaining the lowest possible level of solids over membranes 44 for the longest possible time, and having a batch all reach the desired level at once. This will result in a flux anywhere from, for example, 2 to 8 pounds per square foot of membrane per hour of run, again dependent on pressure, temperature, and flow rates. The product, however, tends to acquire an acid flavor by this method, making it less desirable as a food product although unimpaired as a feed product.

Referring now to FIG. 8 of the drawings, cheese whey is first placed in a separator 126, such as a conventional centrifugal separator, and any fat remaining in the whey is removed. From separator 126 the whey is sent through a, for example, 200 mesh nylon filter bag (not shown) to remove minute curd particles, prior to pasteurization, and then to a pasteurizer 128 and heated to 162° with a holding time of 16 seconds. Refrigeration, or cooling section of the pasteurizer 128 cools the product at the end of the 16 second hot hold back to 94°. The pasteurizer may be of a conventional type. It is desirable that the entire period from heating to cooling be less than 30 seconds. The product then passes to an insulated holding tank 130. A, for example, centrifugal pump 96 draws the product from the insulated holding tank 130 and passes it through a cooling plate 132 which cools the product to a temperature 90°F. A temperature in the range, for example, of 82° to 86°F is preferred, but temperatures as low as 50°F have been used successfully. It is then fed to pump 96 at rates from 27 to 44 gallons per minute on a, for example, four pressure vessel concentrating machine. The feeding rates will of course vary with the number of parallel pressure vessels, with the feed varying from 6½ to 11 gallons per minute per pressure vessel. The rate of separation is more dependent on the rate of flow over the membranes 44 than any other single factor, and typical rates are as given above. The separated protein concentrate is fed from unit 10 and into a refrigerated tank 134 of conventional construction where it is immediately chilled to under 40°F. This method will make a fresh milk flavored, human consumable protein product with a level of protein from about 28 to 60%. The latter is on a dry matter basis, and the level may be varied by adjusting micrometer valve 84. This is a relatively slow method of concentration, however, as for example when micrometer valve 84 is adjusted to give a 24% solid reading on a refractometer, or an actual 22% of solids, the dry matter protein content may be between 50 and 60%. The latter is somewhat dependent upon the season as protein varies in relation to other solids at various times of the year. When operating at this relatively high rate of solids in the system, and at a flow rate of 6½ to 7 gallons of feed per pressure vessel per minute and at a maintained pressure level of 160 psi, and a product inlet temperature of 84°the flux or permeate removal rate will be 1.55 pounds per square foot of surface of membranes 44 per hour of run. This may be increased approximately 30% to 2 pounds per square foot of surface by increasing the flow rate through the pressure vessels 30 to 11 gallons per pressure vessel per minute without detectable problems. The flow rates may also be varied by lesser amounts by increasing the temperature of the inlet feed and increasing the pressure at which the machine operates. They both produce long term detrimental effects, however. The permeate is fed through hose 124 and to a conventional evaporator 136 and crystallizer 138 for processing the lactose in a known manner. The resulting crystallized lactose may be used as a food product.

It has not been found necessary to use a clarifier with a separating unit 10, but rather only a 200 mesh nylon filter (not shown) into which the raw whey is directed. This filter removes any small pieces of curd that have escaped the cheese making process in the separator. The elimination of a clarifier increases the protein yields.

A unit 10 according to the present invention is advantageous in that a greator number of square feet of membrane surface is available by the use of the serially arranged, spiral-wound membrane modules 36. Further, cleaning products can be applied to both sides of membranes 44, and turbulent flow can be directed at both the forward and backward sides of membrane modules 36. Because of the relatively few turns required to be made by the product, a considerable number of pressure vessels 30 and modules 36 can be passed by the whey with little decrease in pressure and without the necessity of interstage pumps to boost the pressure. A contributing factor here is the fact that an arrangement according to the present invention permits the use of piping and valving of sufficient size to reduce constriction of the flow.

It should be mentioned at this point that it is not necessary to arrange the banks 12, 14, and 16 of filters 18, 20, and 22 in the manner shown in FIGS. 1 and 2 of the drawings. Alternatively, the runs of pipes 70 and 72 may be decreased by inverting the flow direction of filters 20 and bank 18 to run from left to right as viewed in FIG. 2 of the drawings, instead of right to left as illustrated. This will merely require reversing end caps 48 and 50 and flow inhibitors 46.

Yet another advantage of using spiral-wound modules 36 is that the micr-pores in membranes 46 are easier to maintain size, as adjusted by heat application, and that the more uniform size of the pores contributes to a higher protein yield. Further, the spiral-wound membrane module 36 is less expensive to construct than, for example, a hollow-tube reverse-osmosis filtration unit.

By using conventional micrometer valves 82 and 84 with their longer, tapered stainless throttling bodies providing large surface for application of pressure and compression valves so situated as to be completely open or completely shut, a unit 10 according to the present invention essentially eliminates the shear or breakup of protein molecules that is apparent in those water purification machines that have been adapted for cheese whey separation and which use ball valves and needle valves.

Still another advantage of membranes 44, is that the use of a scroll type sheet over which the enriched protein product flows, the potential for clogging, possible with fine fiber type systems, is eliminated. Again by the configuration of the membranes 44 in a scroll type roll, with two membranes sealed at the edge and a web arranged between the two to facilitate flow of permeate to the center tube 40, the need for bulky backing for support is not only eliminated by removing the possibility of rupture of membranes 44, but also by the very fact that pressure is equalized on both sides by product flow.

The use of, for example, one inch clear "Tygon" hose for sleeves 115, 116, and 117 on the permeate outlets from the pressure vessels to the collection manifold permits instant detection if one of the O-ring seals mounting these bosses should leak. An end cap 48, 50 may be removed by only removing two thumb screw clamp tighteners, and any module 36 may be pulled out of an associated pressure vessel 30 for inspection or repairs. The design of the unit 10 is such that, for example, six membrane modules 36 may be removed from any pressure vessel 30 individually within a few minutes. The unit 10 according to the present invention, is constructed almost entirely of 3-A approved dairy fittings with replacements available from any dairy supply house, and the 3-A approved materials make it easier to keep unit 10 sanitary. The use of tri-clamp, clean in place, fittings with their flush gaskets designed with flush, highly polished interiors eliminating places for soil or product to collect and allow bacterial growth, facilitates compliance with sanitary standards.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. Apparatus for concentrating whey fluids comprising:
    filter cartridge means containing at least one spiral wound ultrafiltration membrane module, said cartridge means including inlet means, first outlet means for concentrate and second outlet means for permeate,
    means for delivering said fluid under pressure to said inlet means of said filter cartridge means,
    means for cleaning said filter cartridge, said cleaning means comprising first conduit means interconnecting said delivering means and said first outlet means and valve means for selectively directing said fluid from said delivering means to said inlet means or to said first outlet means through said first conduit means,
    second conduit means interconnecting said inlet means and said first outlet means externally of said cartridge means, said second conduit means including valve means for selectively permitting concentrate to flow from said first outlet means toward said inlet means through said second conduit means when said fluid is being delivered to said inlet means or to flow from said inlet means toward said first outlet means through said second conduit means when said fluid is being delivered to said first outlet means,
    third conduit means interconnecting said second conduit means and said delivering means for permitting recycling concentrate through said filter cartridge means, and
    discharge conduit means coupled with said second conduit means, said discharge conduit means including valve means for selectively adjusting the rate of flow of concentrate from said apparatus.

2. The invention set forth in claim 1 wherein said apparatus comprises a bank of said filter cartridge means, each filter cartridge means containing a plurality of spirally wound ultrafiltration membrane modules, said apparatus additionally comprising manifold means connecting said inlet means of each of said cartridge means for simultaneously supplying said fluid thereto, and manifold means connecting said first outlet means of each of said cartridge means for simultaneously collecting concentrate therefrom, said first conduit means connected to said outlet manifold and said second conduit means connecting said inlet and outlet manifolds.

3. The invention set forth in claim 2 wherein said apparatus comprises at least two of said banks of filter cartridge means arranged in series, said outlet manifold of each bank except the last bank being interconnected with the inlet manifold of the next bank, the outlet manifold of said last bank being coupled with said first and second conduit means.

4. The invention set forth in claim 1 wherein said third conduit means additionally comprises valve means for adjusting the rate of flow of concentrate from said second conduit means to said delivering means.

5. The invention set forth in claim 4 wherein each of said valves in said third conduit means and said discharge conduit means consists of a micrometer valve.

6. The invention set forth in claim 5 wherein said apparatus comprises a bank of said filter cartridge means, each filter cartridge means containing a plurality of spirally wound ultrafiltration membrane modules, said apparatus additionally comprising manifold means connecting said inlet means of each of said cartridge means for simultaneously supplying said fluid thereto, and manifold means connecting said first outlet means of each of said cartridge means for simultaneously collecting concentrate therefrom, said first conduit means connected to said outlet manifold and said second conduit means connecting said inlet and outlet manifolds.

7. The invention set forth in claim 6 wherein said apparatus comprises at least two of said banks of filter cartridge means arranged in series, said outlet manifold of each bank except the last bank being interconnected with the inlet manifold of the next bank, the outlet manifold of said last bank being coupled with said first and second conduit means.

8. The invention set forth in claim 7 wherein said apparatus additionally comprises means for pasteurizing and subsequently cooling raw whey before it reaches said delivery means.

9. The invention set forth in claim 1 wherein said apparatus additionally comprises means for pasteurizing and subsequently cooling raw whey before it reaches said delivery means.

* * * * *